United States Patent
Grosch (10) Patent No.: US 7,859,566 B2
(45) Date of Patent: Dec. 28, 2010

(54) ARRANGEMENT OF A FIRST AND AT LEAST A SECOND ADDITIONAL VEHICLE IN A LOOSELY COUPLABLE NOT TRACK BOUND TRAIN

(75) Inventor: Hermann Grosch, Nienhagen (DE)

(73) Assignee: Rheinmetall Landsysteme GmbH, Kiel (DE)

( * ) Notice: Subject to any disclaimer, the term of this patent is extended or adjusted under 35 U.S.C. 154(b) by 1066 days.

(21) Appl. No.: 10/990,772

(22) Filed: Nov. 18, 2004

(65) Prior Publication Data

US 2005/0159852 A1 Jul. 21, 2005

Related U.S. Application Data

(60) Provisional application No. 60/598,540, filed on Aug. 4, 2004.

(30) Foreign Application Priority Data

Jan. 20, 2004 (DE) .................. 10 2004 003 055

(51) Int. Cl.
*H04N 7/12* (2006.01)
(52) U.S. Cl. .................. 348/148; 348/143; 348/159; 701/1; 701/2; 701/23; 701/24; 701/28; 701/200
(58) Field of Classification Search .......... 348/143, 348/148, 159; 701/1, 2, 23, 24, 28, 200
See application file for complete search history.

(56) References Cited

U.S. PATENT DOCUMENTS

| | | | | |
|---|---|---|---|---|
| 6,144,910 A | * | 11/2000 | Scarlett et al. | 701/50 |
| 6,148,255 A | * | 11/2000 | van der Lely | 701/50 |
| 6,226,570 B1 | * | 5/2001 | Hahn | 701/1 |
| 6,732,024 B2 | * | 5/2004 | Wilhelm Rekow et al. | 701/26 |
| 6,859,729 B2 | * | 2/2005 | Breakfield et al. | 701/216 |
| 2002/0165649 A1 | | 11/2002 | Wilhelm Rekow et al. | |

FOREIGN PATENT DOCUMENTS

| | | |
|---|---|---|
| DE | 42 42 541 A1 | 6/1994 |
| DE | 196 14 391 A1 | 10/1997 |
| DE | 4440120 C2 | 3/1998 |

(Continued)

OTHER PUBLICATIONS

German Search Report, dated Sep. 14, 2004.

(Continued)

*Primary Examiner*—Andy S. Rao
*Assistant Examiner*—Geepy Pe
(74) *Attorney, Agent, or Firm*—Griffin & Szipl, P.C.

(57) ABSTRACT

A vehicle train assembly including a first vehicle and at least one further vehicle in a loosely coupleable not-track-bound train where, in particular, a combination of a manned master vehicle and an unmanned slave vehicle is provided, wherein the order that the master vehicle is in, either in front of or behind the slave vehicle, can be selected. Both vehicle types (i.e., master, slave) can be without functional impact whether manned or unmanned. The technical equipment of the vehicle can be so provided that it is selectable which vehicle can be used as master vehicle or slave vehicle. The application is, however, not limited to mine search and clearance vehicles.

19 Claims, 4 Drawing Sheets

FOREIGN PATENT DOCUMENTS

| | | |
|---|---|---|
| DE | 197 05 842 A1 | 8/1998 |
| DE | 197 22 292 A1 | 12/1998 |
| DE | 197 43 024 A1 | 4/1999 |
| DE | 19806066 A1 | 12/1999 |
| DE | 19827377 A1 | 12/1999 |
| DE | 19936054 A1 | 2/2001 |
| DE | 101 09 052 | 9/2002 |
| DE | 101 09 052 A1 | 9/2002 |
| DE | 698 05 160 T2 | 11/2002 |
| DE | 102 15 220 A1 | 10/2003 |
| DE | 102 24 939 A1 | 1/2004 |
| EP | 1 388 724 | 2/2004 |
| EP | 1 388 724 A2 | 2/2004 |
| FR | 2 707 755 | 1/1995 |

OTHER PUBLICATIONS

European Search Report, dated Sep. 9, 2005.
Random House Webster's College Dictionary pp. 1322 and 1415 (1991).
The Delphion Integrated View, Exhibit A.
Webster New Collegiate Dictionary, pp. 452 and 1238, (1977).

* cited by examiner

Fig.4c driving direction

ARRANGEMENT OF A FIRST AND AT LEAST A SECOND ADDITIONAL VEHICLE IN A LOOSELY COUPLABLE NOT TRACK BOUND TRAIN

This application claims priority under 35 U.S.C. §120 to U.S. Provisional Application No. 60/598,540, filed Aug. 4, 2004, and to Germany Application No. 10 2004 003 055.3, filed Jan. 20, 2004, the entire disclosures of which are incorporated herein by reference for all it contains.

FIELD OF THE INVENTION

In actual military scenarios, vehicles and their troops are confronted with diverse threats. Vehicles are attacked not only with directly aimed weapons, such as hand weapons, machine canons, anti-tack weapons, guided weapons, and the like, but also with area effect artillery and mortar weapons. Explosive traps and mines present a particular threat that must be anticipated at all times, and in every place, and can only be cleared with difficulty. In order to protect the vehicles and their troops against these diverse threats, differing measures and technical devices are used.

BACKGROUND OF THE INVENTION

One elementary defense measure resides in protective measures for the vehicle itself. The architecture of vehicles, as well as any passive ground protection mechanisms, make clearing of the vehicle more difficult when hit although the affect of hits on the vehicle and its troops are reduced. On the other hand, active protection systems include, for example, systems for reducing visibility and target acquisition by generating smoke and/or various kinds of fog (See DE 19936054 A1), and for reducing munitions affects such as provided by reactive armory (See DE 4440120 C2). These active protection systems are available for augmenting the ground protection mechanisms. However, countermeasures are often developed to thwart the protective measures provided by active protective systems. In particular, for example, as a measure used against reactive armor, missiles are known that can penetrate this kind of armor (See DE 19806066 A1). Thus, it is not always possible, depending on the actual quality of the threat, to always satisfactorily provide adequate protection for vehicles and their troops using available technology. One example of a threat that is especially difficult to provide adequate protection against is explosive traps built into the side of the road. In their simplest form, such booby traps comprise a large quantity of explosives that are detonated either by manual or remote control fuses upon passing by of a vehicle, or detonated automatically using a vehicle recognizing ignition mechanism (See DE 19827377 A1).

Controlled vehicles, unmanned and without troops, have the object of avoiding putting personnel into such threat scenarios. A disadvantage of controlled vehicles is that such vehicles cannot achieve a sufficient quality of autonomy using available technology, which severely limits the use of unmanned vehicles for military applications. Prior art remote controlled vehicles that are, for example, used in the clearing of ordinance (See DE 10215220 A1, DE 19614391 A1) often have the disadvantage that their control is inconvenient and expensive. Consequently, the application of these vehicles to situations that do not present a great threat does not make sense, from a practical standpoint.

Thus, the present invention has the object of providing a vehicle assembly system that can be applied both to manned and unmanned vehicles and that increases the survivability of troops in a ground vehicle in exceptionally dangerous situations. The object of the present invention is achieved using the concept of a vehicle train as will be described below.

SUMMARY OF THE INVENTION

The basic idea, in accordance with the present invention, lies in the concept that vehicles in a combination of a manned master vehicle and at least one unmanned slave vehicle can be applied wherein the order of master vehicle in front of, or behind of, the slave vehicle can be selected so that, preferably, an enemy cannot recognize which vehicle is the master and which is the slave. Special vehicles can be designed with this ability in mind. However, in accordance with the scope of the present invention, both vehicles (i.e., master, slave) can be unmanned or manned without reducing their functionality. The technical equipment of a vehicle can be implemented so that the vehicle can be applied selectively as either master vehicle or slave vehicle. Principally, vehicles with a master and/or slave ability can, like conventional vehicles, be driven manned (i.e., manually driven by an operator). The equipment of a vehicle for implementing either a master and/or slave ability in no way reduces the utilization of the vehicle. In other words, a vehicle constructed in accordance with the present invention, with structure implementing the vehicle as having either a master and/or a slave ability, does not diminish the operation and function of the vehicle. The manner of use (i.e., as master or slave) can be selected when the vehicle is used in scenarios depending on a particular threat level assessed. For example, in scenarios where there is no particular threat, each vehicle may optionally be driven manned.

In the combination of a master vehicle and a slave vehicle, such as when a particular threat is present, the master vehicle is manned and the slave vehicle is unmanned. In this embodiment of the present invention, the slave vehicle is bound to the master vehicle over a non-moving electronic hitch (an "electronic hitch" is an electronic communications system allowing the slave vehicle to automatically follow behind the master vehicle at a pre-selected distance without requiring mechanical connection between the two) (See, for example, DE 19743024 A1). The slave vehicle is used behind the manned master vehicle and follows the movements of the master vehicle automatically at a pre-selected distance. This master-slave application is preferably chosen when the vehicles are used in theaters with heightened threat.

If the unmanned slave vehicle is used in front of the manned master vehicle, the user in the master vehicle steers the slave vehicle by, at least, use of a driving camera. In this embodiment of the present invention, the master vehicle is coupled to the slave vehicle over an electronic hitch and follows the vehicular movements of the slave by a pre-selected distance. This manner of use is preferably selected when the vehicles must be used on stages with acute mine threats. The advantages of this embodiment, in accordance with the present invention, resides in that the first driving slave vehicle serves as a protective shield for the master vehicle against mines and weapon effects arising from the front end of the vehicle train. In this embodiment of the present invention, only one driver for both vehicles is necessary because of the electronic hitch coupling both vehicles so they move together, albeit separated by a pre-selected distance.

In the case of a particularly grave threat, for example, when driving into an enemy controlled village, the slave vehicle can be decoupled from the electronic hitch, as proposed in DE 19743024 A1. In one embodiment in accordance with the present invention, when the slave vehicle is decoupled from the master vehicle, as proposed in DE 19743024 A1, a driver in the decoupled slave vehicle manually continues driving the decoupled vehicle. Alternately, in accordance with another embodiment of the present invention, the crew of the master vehicle can remotely control the slave vehicle with cameras and remote controls. By using auxiliary systems, for example, that recognize streets and obstacles, the operator manually steering the slave vehicle is significantly less burdened.

In accordance with the present invention, the decoupled slave vehicle can once again be re-coupled to the master vehicle when it is again positioned at a certain pre-selected distance and orientation from the master vehicle. Once re-coupled with the master vehicle, the slave vehicle is driven either ahead of or behind the master vehicle via the electronic hitch. This positioning for re-coupling can take place either automatically or by means of remote control. In this manner, the slave vehicle can be remote controlled by the master vehicle over greater distances without the need for direct visual contact. Furthermore, in accordance with the present invention, the remote control of the slave vehicle is provided by the driver of the master vehicle while manning his working position in the master vehicle. In accordance with the present invention, switching of a service person operating the master vehicle when he must leave his position, can be carried out at any time without delay.

It is known from DE 10109052 A1, that at least in a first and a last vehicle in a loosely coupled train, the last vehicle of the train includes a reporting device, and at least the first and the last vehicle include a device for vehicle-to-vehicle communication. The vehicle-to-vehicle communications device may be a waveguide, a radio, a laser or an infrared sending and receiving installation.

In accordance with the present invention, the advantages of an unmanned vehicle are combined with the abilities of personnel to apply a vehicle in a manner appropriate to the threat situation. An electronic hitch is used so that the unmanned slave vehicle can be selectively driven before, or behind of, the manned master vehicle. When the slave vehicle is positioned behind the master vehicle (i.e., quasi trailer usage), the crew of the master vehicle has no restriction in view, or line of sight, facing toward the front of the master vehicle. When the slave vehicle is used before the master vehicle (i.e., positioned in front of the master vehicle), the user views scenes in front of the slave vehicle, for example, by means of pictures displayed on monitors in the master vehicle, or less preferably on monitors in the slave vehicle. In this embodiment, the pictures displayed on the monitors are taken using cameras mounted on the front or side of the slave vehicle.

Even conventionally available vehicles can be made, by means of supplementally provisioned hardware, with the ability to be a master vehicle or a slave vehicle. Once properly equipped, such a vehicle can always be selectively operated as a conventional vehicle, or a master vehicle, or as a slave vehicle. Furthermore, the present invention is not limited only to mine search and clearance systems, rather master and slave vehicle trains assembled in accordance with the present invention have application to other vehicle types.

In accordance with the above objectives, a first apparatus embodiment of the present invention provides an arrangement of a first (1) and at least one further vehicle (2) in a loose coupleable not-track-bound train, with means (3) for coupling and vehicle/vehicle communication, with each having at least one drive and guidance system (9, 9.2) with necessary actuators (11, 11.2), on which the user elements of each vehicle (1, 2) can be actuated, wherein the further vehicle (2) serves as a slave vehicle, which can be manned and is remotely controllable from a first vehicle (1) which serves as a master vehicle selectively either driving in front and/or following and moving therewith, wherefore the controlled vehicle (2) has at least one camera (6) on the vehicle (2) and the controlling vehicle (1) has at least one monitor (5) that are functionally connected with one another over vehicle/vehicle communication (7), and the drive and guidance system (9.2) of the controlled vehicle (2) is usable over the user elements of the controlling vehicle (1).

In accordance with a second apparatus embodiment of the present invention, a loose coupleable not-track-bound vehicle train assembly is provided that includes: (a) a first vehicle operating as a master vehicle, the first vehicle comprising at least one monitor; and (b) at least one second vehicle comprising means for coupling, means for vehicle/vehicle communication, and at least one camera disposed on the second vehicle, wherein each one of the first vehicle and the second vehicle has at least one drive and guidance system connected to receive input from an actuator and from one or more user elements, wherein the second vehicle operates as a slave vehicle and is connected to the master vehicle by the means for coupling and the means for vehicle/vehicle communication, wherein the second vehicle is optionally manned, and is remotely controllable from the first vehicle, wherein the second vehicle is selectively driven either in front of, or following, the first vehicle so as to move therewith, wherein the at least one camera disposed on the second vehicle is functionally connected to send pictures to the at least one monitor of the first vehicle over the means for vehicle/vehicle communication, and the drive and guidance system of the second vehicle is connected to receive user input signals from the user elements of the first vehicle.

In accordance with a third apparatus embodiment of the present invention, a loose coupleable not-track-bound vehicle train assembly includes: (a) a first vehicle comprising: (i) a first drive and guidance system connected to receive input from a first central processor, a first actuator, and one or more first user elements; (ii) a first transmission module electronically connected to the first central processor; (iii) one or more first electronic hitch devices connected to the first central processor; and (iv) one or more components selected from the group consisting of a camera and a monitor, wherein the camera is disposed on the first vehicle and connected to send picture data to the first central processor and the monitor is disposed at a first user position and is connected to receive picture data from the first transmission module; and (b) a second vehicle comprising: (i) a second drive and guidance system connected to receive input from a second central processor, a second actuator, and one or more second user elements; (ii) a second transmission module electronically connected to the second central processor; (iii) one or more second electronic hitch devices connected to the second central processor; and (iv) one or more components selected from the group consisting of a camera and a monitor, wherein the camera is disposed on the second vehicle and connected to send picture data to the second central processor and the monitor is disposed at a second user position and is connected to receive picture data from the second transmission module; wherein one first hitch device of the first vehicle is coupled to one second hitch device of the second vehicle, and one of the first vehicle and the second vehicle is a master vehicle controlling movement of the other vehicle.

In accordance with a first process embodiment of the present invention, a process for controlling a controllable vehicle by a controlling vehicle in a loosely coupleable not-track-bound vehicle train is provided, wherein the process includes the steps of: (a) providing a loosely coupleable not-track-bound vehicle train comprising one controlling vehicle and at least one controlled vehicle, wherein each vehicle includes a drive and guidance system; and (b) controlling movement of the controlled vehicle by controlling the drive and guidance system of the controlled vehicle through input signals generated by manipulating user elements of the controlling vehicle.

Further objects, features and advantages of the present invention will become apparent from the Detailed Description of Illustrative Embodiments, which follows, when considered together with the attached drawings.

BRIEF DESCRIPTION OF THE DRAWINGS

The invention will be more closely described by means of the non-limiting illustrative embodiments. It is shown that.

DETAILED DESCRIPTION OF ILLUSTRATIVE EMBODIMENTS

Figure 1:
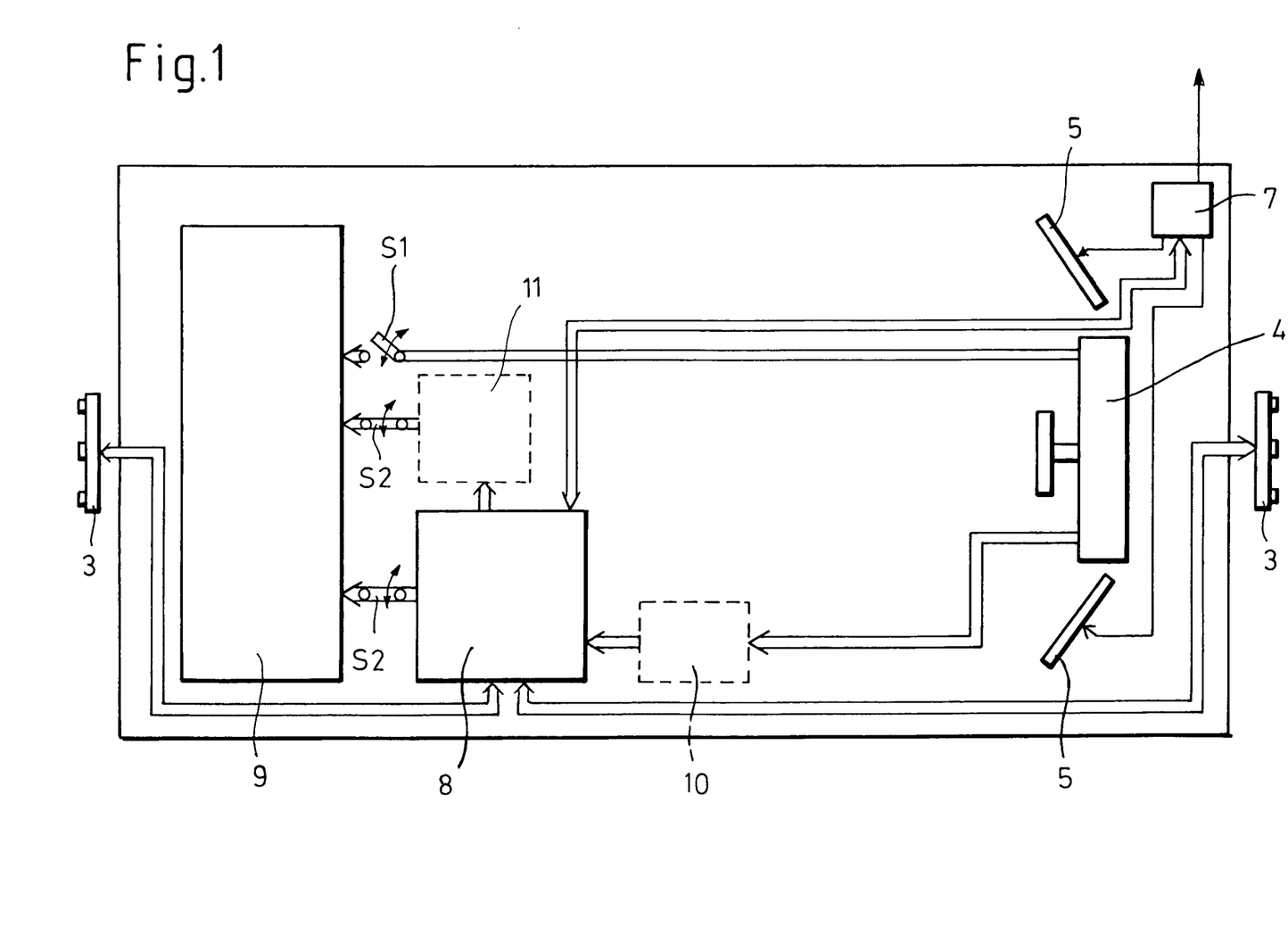
FIG. 1 is a sketch of a master vehicle in accordance with the present invention.
Figure 2:
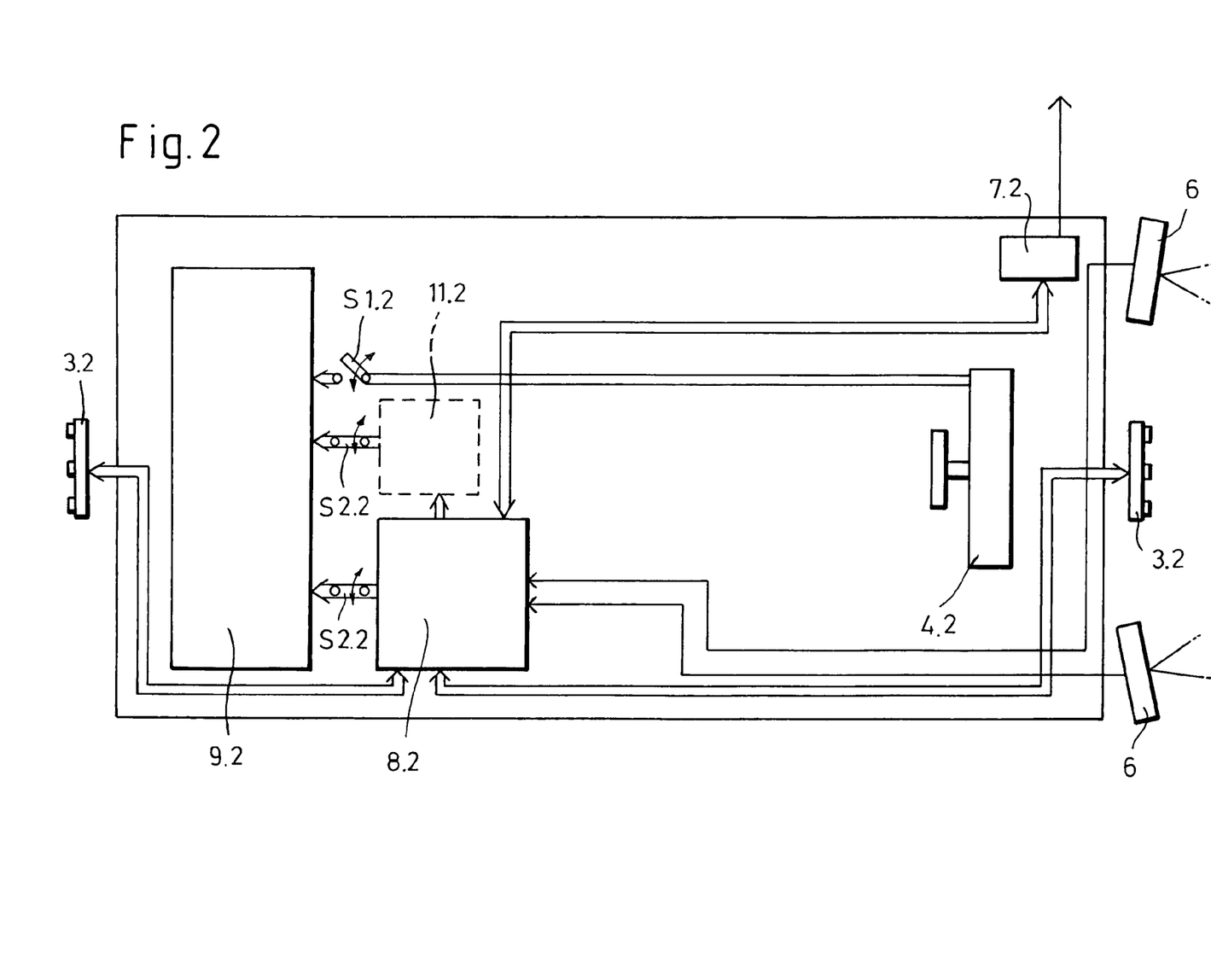
FIG. 2 is a sketch of a slave vehicle in accordance with the present invention.
Figure 3:
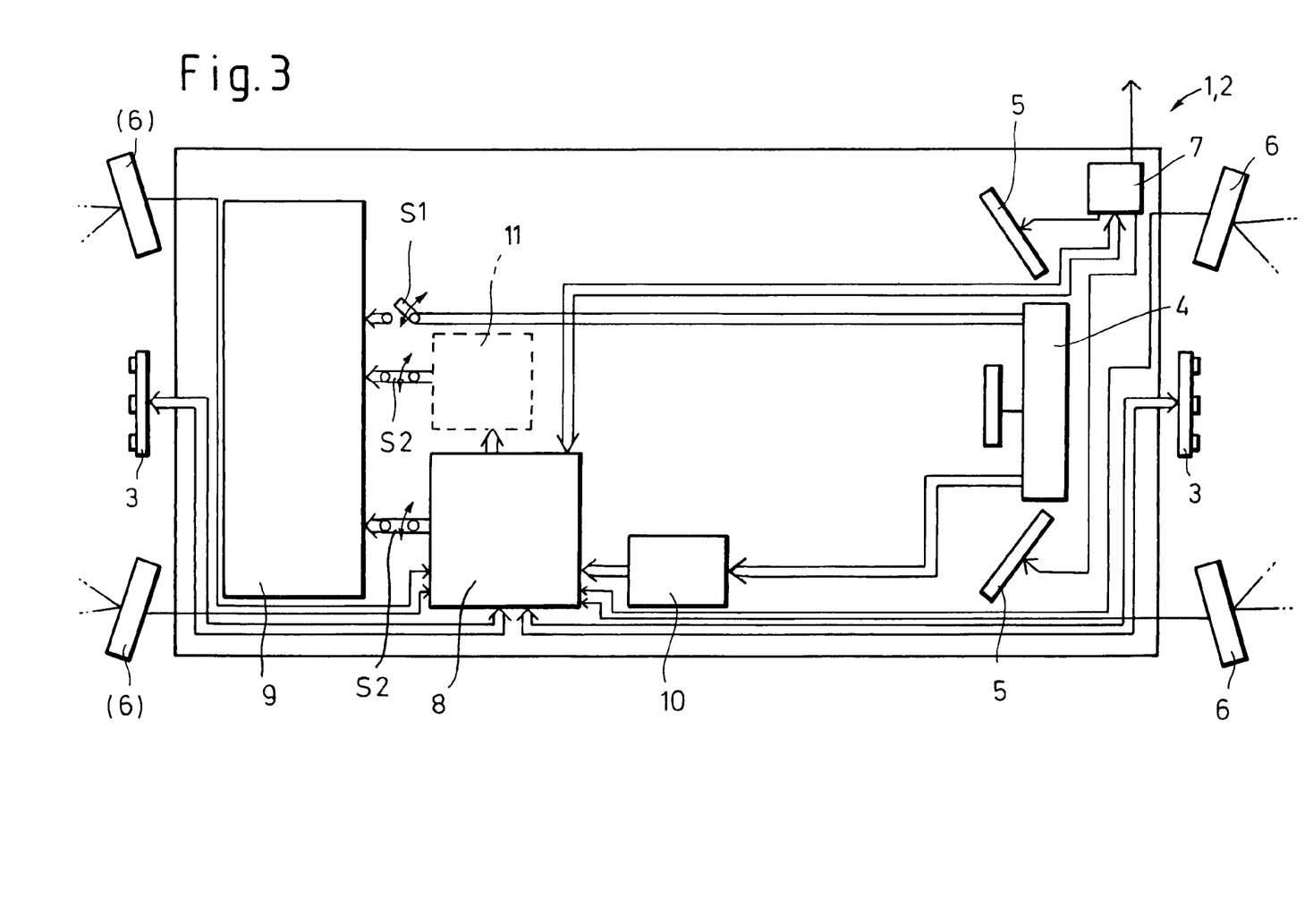
FIG. 3 is a sketch of a combined master/slave vehicle in accordance with the present invention.

The vehicle system or assembly, in accordance with the present invention described herein, comprises at least two vehicles 1 and 2. At least one of the vehicles of the assembly should have the capabilities of a master vehicle 1, and at least one other vehicle of the assembly should have those capabilities of a slave vehicle 2. For the purposes of designating various components of the invention in the various drawings, like parts will be designated by like character references.

FIG. 1 shows schematically the substantial functional elements that give vehicle 1 the capabilities of a master vehicle. Preferably, in front and behind locations on vehicle 1 there are mounted devices 3 providing an electronic hitch, such as a distance meter, etc. A user position 4 (not shown in greater detail), having user elements (i.e., steering, brake, accelerator, etc.) for operating the master vehicle 1, has at least one monitor 5. Electronically connected to this monitor 5 is a transmission module 7 serving as a vehicle-to-vehicle communication module, which is functionally connected to a central processor 8, and to an electrical contact. Reference numeral 9 indicates a drive and guidance system, such as are known in the art, and is connected to the processor 8. Drive and guidance system 9 operates so that the vehicle 1 is steered by user elements such as an accelerator, brake, steering, etc. For the purposes of this disclosure, it is not necessary to describe the drive and guidance system 9 in more detail.

FIG. 2 schematically shows substantially the functional elements that give vehicle 2 the capabilities of a slave vehicle. The equipment of vehicle 2, which couples to vehicle 1, corresponds largely to the equipment of master vehicle 1; for example, switch S1.2 in FIG. 2 corresponds to switch S1 in FIG. 1, and switch S2.2 in FIG. 2 corresponds to switch S2 in FIG. 1. The differences reside in that the slave vehicle 2 additionally comprises at least one driving camera 6, whose pictures are transmitted by means of processor 8.2 and the transmission module 7.2 to transmission module 7 of the master vehicle 1. Picture data received by transmission module 7 is sent to monitor 5, which displays the picture data.

The master vehicle 1 and slave vehicle 2 are not necessarily the same type of vehicle. While this may be the case, more typically the master vehicle 1 will be constructed to accommodate a human operator, whereas the slave vehicle 2 is preferably unmanned. Therefore, monitors for the user are, generally, left out of the construction of the slave vehicle 2. In addition, data recognition of actions of the user at user position 4.2 can also be left out of the slave vehicle 2. However, it is within the scope of the present invention to provide vehicle 2 with monitors and with the capacity to recognize data arising from actions of a user at user position 4.2.

Master vehicle 1 is therefore capable of driving ahead of, or following behind of, a vehicle such as a slave vehicle 2, which has complementary devices 3 of the electronic hitch. Pictures taken by at least one driving camera 6 of the slave vehicle 2 are shown on monitor 5 for a user/operator (not shown) in the master vehicle 1 to see whether the slave vehicle 2 is coupled over electronic hitch 3, or used in a remote control manner independently of master vehicle 1. The picture data provided by driving camera 6 of the slave vehicle 2 are received over transmission module 7 of vehicle 1. This transmission module 7 can be an intrical component of the electronic hitch 3 when vehicles 1, 2 are coupled by the electronic hitch 3. In remote control use where there are greater distances separating the master and slave vehicles 1 and 2, light pipes, radio or laser can also be used for transmitting picture data from transmission module 7.2 of vehicle 2 to the transmission module 7 of vehicle 1, which then transmits the picture data to the display module 5.

It is principally provided that the user controls the drive and guidance system 9 in the master vehicle 1 by means of certain user elements, such as an accelerator, brake, steering controls, etc. located at the user position 4. In the operational mode wherein the master vehicle 1 is positioned to follow the slave vehicle 2, switch S1 is closed and switch S2 is opened. In this "user controlled mode" the actions of the user/operator at user position 4 are transferred to directly impact the drive and guidance system 9 as would be evident from FIG. 1. However, the actions of the user/operator in user position 4 of the master vehicle 1 can be supplementally detected by central processor 8, which is also connected to receive input from user position 4. For vehicles driven by conventional wire steering, for example, data (i.e., steering data) are typically provided for digitally based on the user's manipulation of the steering. In this case, data is inputted directly from the user position 4 into the drive and guidance system 9 (i.e., when switch S1 is closed and switch S2 is open, so data is input from the user position 4 into the drive and guidance system while the vehicle 1 operates in the user controlled mode). For vehicles constructed without wire drive technology, the actions of the user must be transferred from the user elements manually manipulated by the user through corresponding sensors 10, and then transferred as signal data inputted to the processor 8. In such a case, the vehicle 1 still operates in a user controlled mode, except that data signals from sensors 10 must route through processor 8, with or without augmentation by processor 8, before being input into drive and guidance system 9. In this mode of operation, data signals originating from user elements located at the user position 4 still impact the operation of the drive and guidance system 9, although augmentation by the processor 8 is possible as an option.

The drive and guidance system 9 of the vehicle 1 can, according to the option selected by the user/operator, be steered by processor 8 instead of the user (i.e., to be driven or guided in an "automatic following" mode). When operated in the automatic following mode, the user elements (i.e., steering wheel, control stick, brake, accelerator, etc.) of the user position 4 do not impact operation of the drive and guidance system 9; rather, it is the processor 8 that controls the drive and guidance system 9, which is why the switch S1 is open and the switch S2 is closed as shown in FIG. 1.

Thus, steering can result directly by means of a drive by a wire system when the vehicle 1 is operated in the user controlled mode. In the alternative, steering can result directed by means of a drive via a sensor system. In a conventional drive and guidance system 9, the steering and guidance commands provided by sensors 10 and interpreted by processor 8 must be affected via a suitable actuator 11 on drive and guidance system 9. Data exchange, pertaining to steering data and other condition data exchanged with the slave vehicle 2, results from central processor 8 exchanging data over the transmission module 7. In this "trailer usage" mode of operation, the master vehicle 1 is steered by its user (i.e., a person at the controls at user position 4) utilizing the user sub-unit of the drive and guidance system 9 so that the user steers the drive and guidance system of vehicle 1 (i.e., switch S1 locked in closed position, switch S2 open). The slave vehicle 2, using processor 8.2, processes the data received from vehicle 1 through electronic hitch 3, and follows automatically the driving movements of the master vehicle 1.

Figure 4A:
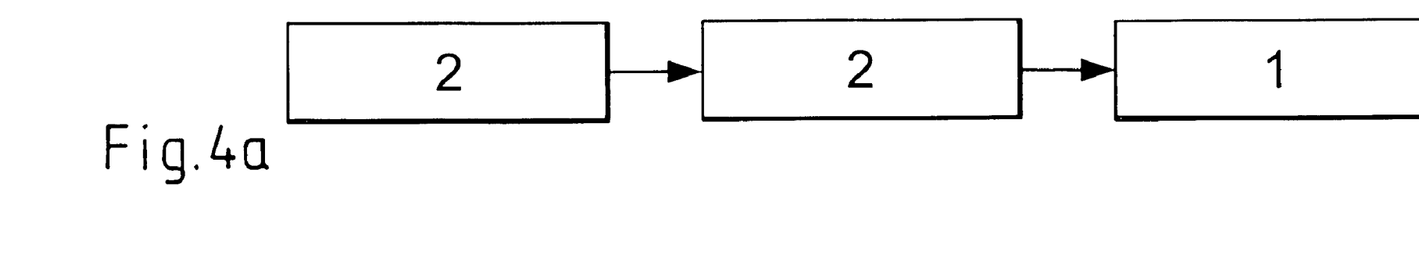
FIG. 4 illustrates various master and slave vehicle combination possibilities for vehicle coupling in a vehicle train in accordance with the present invention.
Figure 4B:
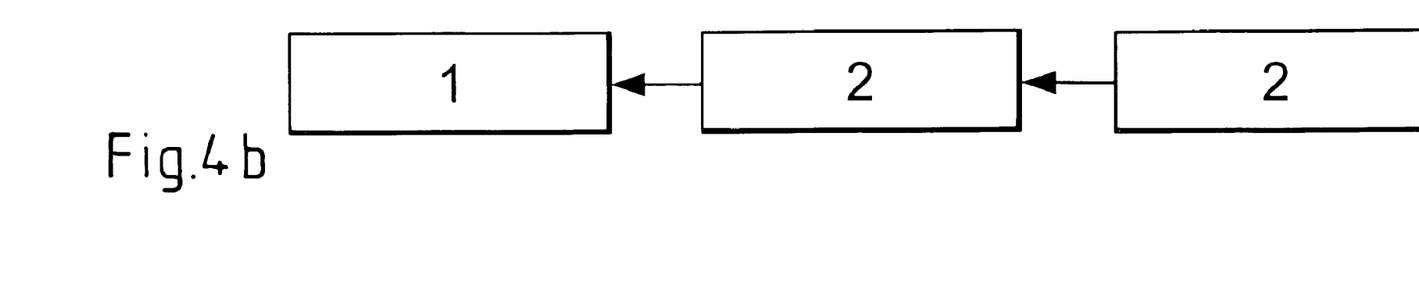
Figure 4C:
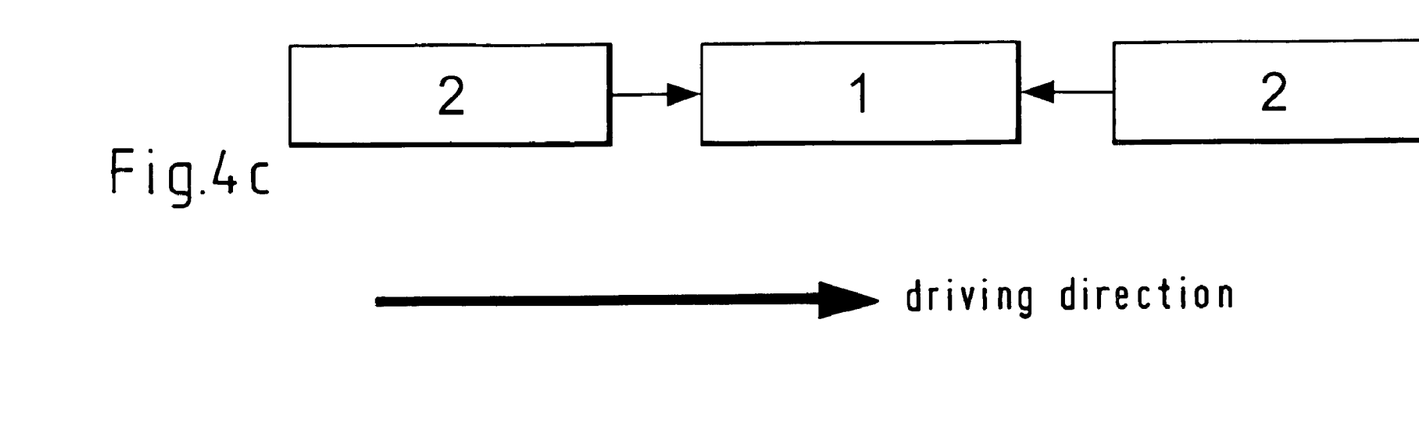

When the slave vehicle 2 is used and placed in front of the master vehicle 1 (see, for example, FIGS. 4b and 4c), the user/operator of master vehicle 1 steers slave vehicle 2 from his user position 4 using picture data from driving camera 6. The pictures from driving camera 6 of slave vehicle 2 are shown on one or more monitors 5 of master vehicle 1 so the user/operator has a view of the terrain in front of the slave vehicle 2. The actions of the user/operator (i.e., the driver) through user elements in user position 4 are directly transmitted as signals to slave vehicle 2 via central processor 8 and transmission module 7. These transmitted signals originating from vehicle 1 affect the control of the drive and guidance system 9.2 of the slave vehicle 2 via transmission by transmission module 7.2 and central processor 8.2. Preferably in this case, the drive and guidance system 9 of the master vehicle 1 is decoupled by the user/operator from the user elements at user position 4 so the vehicle 1 is controlled by processor 8 (i.e., switch S1 open, switch S2 closed, corresponding to an automatic following mode). The drive and guidance system 9 then detects, by means of electronic hitch 3 and the corresponding signals transmitted by central processor 8, the distance, speed and orientation of slave vehicle 2 relative to master vehicle 1. With this collected data pertaining to the slave vehicle 2, the control data for the drive and guidance system 9 of master vehicle 1 is calculated by central processor 8 so that the master vehicle 1 follows in the tracks of the slave vehicle 2 at a predetermined distance.

In other words, when the slave vehicle 2 is positioned in front of the master vehicle 1 and controlled via remote control from vehicle 1, the master vehicle 1 is placed in an automatic following mode so central processor 8 can control the drive and guidance system 9 so the master vehicle 1 follows the remotely controlled slave vehicle 2. On the other hand, when the slave vehicle is positioned behind of the master vehicle 1, then it is the central processor 8.2 of vehicle 2 that controls the drive and guidance system 9.2 of vehicle 2 so the slave vehicle follows the movements of the master vehicle 1 at a predetermined distance separating the two vehicles. Of course, in this second case, the movements of the master vehicle 1 are being controlled by a user sitting at the user position 4 of the master vehicle 1 and who is manipulating the user elements, which input user input control signals into the drive and guidance system 9.

However, vehicle 2 can be principally driven in a conventional manner. In this conventional manner of operation, the functions of the processor 8, the sensors 10, the actuators 11 connected to the electronic hitch 3, the transmission module 7, and the monitors 5, are not necessary. Thus, during conventional operation of vehicle 2, these components can be deactivated or decoupled from the drive and guidance system 9 and/or of the electronic hitch 3 so vehicle 2 can be operated in the conventional manner.

Also, the vehicles can be principally configured so that, whether master vehicle 1 or slave vehicle 2 are used, each is freely selectable. An advantage of such a configuration resides in that it is not possible for a hostile entity to tell from the outside which of the two vehicles is driven manned, whether the slave vehicle 2 drives in front of or follows the master vehicle 1. Also, it is principally possible to use multiple slave vehicles 2 to only one master vehicle 1. In other words, one or more slave vehicles can be coupled to one master vehicle, and in any permutated fashion either ahead of, or following behind of, or in some mixture thereof, of the master vehicle. That is, a portion of the slave vehicles 2 in the vehicle train assembly drives behind master vehicle 1, and a portion of the slave vehicles in the vehicle train assembly drives in front of master vehicle 1 as shown in the non-limiting FIGS. 4A, 4B, and 4C. With these longer vehicle trains, it would not be recognizable, or it would be even less recognizable, on which position in the vehicle train assembly the manned master vehicle 1 is found.

In summary, the present invention includes a loosely coupleable not-track-bound vehicle train assembly that includes at least two vehicles, which are a master vehicle 1 and a slave vehicle 2. The master vehicle includes structure for controlling movement of the slave vehicle so the vehicle train is operable in three modes. In a first mode, the master vehicle 1 is operated by a user located in the master vehicle. In the first mode, the master vehicle is being operated in a user controlled mode and is controlled by the user who manipulates the user elements located inside the master vehicle. At the same time, the slave vehicle 2 operates in a trailer usage mode, wherein the central processor 8.2 of the slave vehicle controls the drive and guidance system 9.2 of the slave vehicle so that the slave vehicle follows, or trails behind, the master vehicle 1. In the first mode, the master vehicle 1 and the slave vehicle 2 are coupled through the electronic hitch provided by devices 3.

In a second mode, the slave vehicle 2 moves in front of the master vehicle 1 because the user in the master vehicle manipulates user elements or other controls inside the master vehicle so as to remotely control the movement of the slave vehicle. Under these conditions, the slave vehicle 2 is operating under a "remote control" mode. At the same time, the master vehicle 1 is operating under an automatic following mode so as to follow and trail the movements of the remotely controlled slave vehicle 2. In the second mode, the master vehicle 1 and the slave vehicle 2 are also coupled through the electronic hitch provided by devices 3.

In a third mode of operation, the master vehicle 1 and the slave vehicle 2 are decoupled and are operated conventionally. The third mode is referred to as the conventional mode of operation. Under the condition of the third mode of operation a user located in the master vehicle 1 manipulates user elements inside of the master vehicle so as to effect control over the movements of the master vehicle. Likewise, another user located in the slave vehicle 2 manipulates user elements inside of the slave vehicle so as to effect control over the movements of the slave vehicle. In order to operate the vehicle train in the conventional mode, both the master vehicle 1 and the slave vehicle 2 must be manned and the electronic hitch provided by devices 3 must by deactivated or operated so as to have no impact on the movement of the master vehicle and the slave vehicle.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

REFERENCE NUMERALS

1—Master Vehicle
2—Slave Vehicle
3—(3.2) Electronic hitch
4—(4.2) User position vehicle 1 (2)
5—Monitor for driving camera
6—Camera
7—(7.2) Data transmission device/transmission module
8—(8.2) Central processor
9—(9.2) Drive and guidance system
10—Sensors (for user elements)
11—(11.2) Actuators for the drive and guidance system

The invention claimed is:

1. A loose coupleable not-track-bound vehicle train assembly, comprising:
    (a) a first not-track-bound vehicle operating as a master vehicle, the first vehicle comprising at least one monitor; and
    (b) at least one second not-track-bound vehicle comprising
        (i) means for coupling;
        (ii) means for vehicle/vehicle communication; and
        (iii) at least one camera disposed on the second vehicle;
    wherein each one of the first vehicle and the second vehicle has at least one drive and guidance system connected to receive input from an actuator and from one or more user elements,
    wherein the second vehicle operates as a slave vehicle and is connected to the master vehicle by the means for coupling and the means for vehicle/vehicle communication,
    wherein the second vehicle is optionally manned,
    wherein the at least one camera disposed on the second vehicle is functionally connected to send pictures to the at least one monitor of the first vehicle over the means for vehicle/vehicle communication,
    wherein the drive and guidance system of the second vehicle is connected to receive user input signals from the user elements of the first vehicle so that the second vehicle is remotely controlled from the first vehicle and the first and second vehicles of the not-track-bound vehicle train assembly are operable in a first mode and in a second mode,
    wherein, in the first mode, the second vehicle is driven and steered in front of the first vehicle so as to move therewith, and
    wherein, in the second mode, the second vehicle is driven and steered so as to follow the first vehicle so as to move therewith, and
    wherein the means for vehicle/vehicle communication on the second vehicle is a first transmission module connected to receive picture data from the at least one camera disposed on the second vehicle and to transmit the picture data as a vehicle/vehicle communication to a second transmission module disposed on the first vehicle.

2. An assembly according to claim 1, wherein the means for coupling comprises an electronic hitch operable to allow the master vehicle to control the movements of the slave vehicle without requiring a mechanical connection between the two.

3. An assembly according to claim 2, wherein the first transmission module of the second vehicle is an integral component of the electronic hitch.

4. An assembly according to claim 2, wherein the electronic hitch includes a component selected from the group consisting of a waveguide, a radio and a laser.

5. An assembly according to claim 1, wherein the second vehicle further comprises a central processor connected to input control signals to the drive and guidance system of the second vehicle.

6. An assembly according to claim 1, wherein the first vehicle further comprises a central processor connected to input control signals to the drive and guidance system of the first vehicle, wherein in an automatic following mode movement of the first vehicle is controlled by the central processor of the first vehicle so the first vehicle moves along with the second vehicle so the first vehicle and the second vehicle move together while separated by a pre-determined distance.

7. An assembly according to claim 1, wherein the second vehicle further comprises a central processor connected to input control signals to the drive and guidance system of the second vehicle, wherein in a trailer usage mode movement of the second vehicle is controlled by the central processor of the second vehicle so that the first vehicle and the second vehicle move together while separated by a pre-determined distance.

8. An assembly according to claim 1, wherein the second vehicle is a mine search and clearance vehicle.

9. An assembly according to claim 1, wherein the second vehicle further includes an assistance system, for detecting streets and obstacles, connected to the second vehicle.

10. A loose coupleable not-track-bound vehicle train assembly comprising:
    (a) a first not-track-bound vehicle comprising:
        i. a first drive and guidance system connected to receive input from a first central processor, a first actuator, and one or more first user elements;
        ii. a first transmission module electronically connected to the first central processor;
        iii. one or more first electronic hitch devices connected to the first central processor; and
        iv. one or more monitors disposed at a first user position and connected to receive picture data from the first transmission module; and
    (b) a second not-track-bound vehicle comprising:
        i. a second drive and guidance system connected to receive input from a second central processor, a second actuator, the one or more first user elements, and one or more second user elements;
        ii. a second transmission module electronically connected to the second central processor;
        iii. one or more second electronic hitch devices connected to the second central processor; and
        iv. one or more cameras disposed on the second vehicle and connected to send picture data to the second central processor;
    wherein one first hitch device of the first vehicle is coupled to one second hitch device of the second vehicle;
    wherein the first vehicle is the master vehicle and the second vehicle is a slave vehicle; and
    wherein the one or more first user elements of the master vehicle control the drive and guidance system of the slave vehicle so as to drive and steer the slave vehicle of the not-track-bound vehicle train assembly.

11. An assembly as recited in claim 10, wherein the first vehicle is coupled in front of the second vehicle, and the second transmission module receives first control signals from the first transmission module, wherein the second central processor receives the first control signals from the second transmission module and sends control input to the second drive and guidance system so as to operate the assembly in a trailer usage mode whereby movement of the second vehicle is controlled by the second central processor of the second vehicle so the first vehicle and the second vehicle move together while separated by a pre-determined distance.

12. An assembly as recited in claim 10, wherein the first vehicle is coupled behind of the second vehicle, and the second transmission module receives first control signals from the first transmission module, wherein the second central processor receives the first control signals from the second transmission module and sends control input to the second drive and guidance system so the first vehicle controls movement of the second vehicle by remote control, whereas the first central processor of the first vehicle operates the assembly in an automatic following mode whereby movement of the first vehicle is controlled by the first central processor of the first vehicle so the first vehicle and the second vehicle move together while separated by a pre-determined distance.

13. An assembly as recited in claim 10, further comprising:
    (c) a third not-track-bound vehicle comprising:
        i. a third drive and guidance system connected to receive input from a third central processor, a third actuator, and one or more third user elements;
        ii. a third transmission module electronically connected to the third central processor;
        iii. one or more third electronic hitch devices connected to the third central processor; and
        iv. one or more cameras disposed on the third vehicle and connected to send picture data to the third central processor; wherein the first vehicle has a second first hitch device coupled to one third hitch device of the third vehicle, wherein the third vehicle is a slave vehicle and the first vehicle controls movement of the third vehicle of the not-track-bound vehicle train assembly.

14. A process for controlling a controllable vehicle by a controlling vehicle in a loosely coupleable not-track-bound vehicle train, the process comprising the steps of:
    providing a loosely coupleable not-track-bound vehicle train comprising one controlling not-track-bound vehicle and at least one controlled not-track-bound vehicle, wherein each vehicle includes a drive and guidance system; and
    controlling movement of the controlled vehicle by controlling the drive and guidance system of the controlled vehicle through input signals generated by manipulating user elements of the controlling vehicle so that the controlled vehicle is driven and steered from the controlling vehicle of the not-track-bound vehicle train.

15. An assembly as recited in claim 1, wherein the one or more user elements of the first vehicle include one or more first user elements that are usable to steer the first vehicle and one or more second user elements that are usable to steer the second vehicle.

16. An assembly as recited in claim 10, wherein the one or more user elements of the first vehicle include one or more first user elements that are usable to steer the first vehicle and one or more second user elements that are usable to steer the second vehicle.

17. An assembly as recited in claim 1, wherein, in the first mode, the second vehicle is driven and steered by remote control in front of the first vehicle by a driver located in the first vehicle who manipulates user elements in the first vehicle, and a first processor, operably connected to the drive and guidance system of the first vehicle, drives and steers the first vehicle so the first vehicle moves with the second vehicle, and wherein, in the second mode, the first vehicle is driven and steered by the driver located in the first vehicle who manipulates user elements in the first vehicle, and a second processor, operably connected to the drive and guidance system of the second vehicle, drives and steers the second vehicle so the second vehicle follows the first vehicle.

18. A loose coupleable not-track-bound vehicle train assembly, comprising:
    (a) a first not-track-bound vehicle operable as a master vehicle or a slave vehicle, the first vehicle comprising at least one monitor and at least one camera; and
    (b) at least one second not-track-bound vehicle operable as a master vehicle or a slave vehicle, wherein the second vehicle comprises
        (i) means for coupling;
        (ii) means for vehicle/vehicle communication; and
        (iii) at least one camera and at least one monitor disposed on the second vehicle;
    wherein each one of the first vehicle and the second vehicle has at least one drive and guidance system connected to receive input from an actuator and from one or more user elements,
    wherein when the second vehicle is operated as a slave vehicle and the first vehicle is operated as the master vehicle, the second vehicle is connected to the first vehicle by the means for coupling and the means for vehicle/vehicle communication, the at least one camera disposed on the second vehicle is functionally connected to send pictures to the at least one monitor of the first vehicle over the means for vehicle/vehicle communication,
    wherein the drive and guidance system of the second vehicle is connected to receive user input signals from the user elements of the first vehicle so that the second vehicle is remotely controlled from the first vehicle and the first and second vehicles of the not-track-bound vehicle train assembly are operable in a first mode and in a second mode,
    wherein, in the first mode, the second vehicle is driven and steered in front of the first vehicle so as to move therewith, and
    wherein, in the second mode, the second vehicle is driven and steered so as to follow the first vehicle so as to move therewith, and
    wherein the means for vehicle/vehicle communication on the second vehicle is a first transmission module connected to receive picture data from the at least one camera disposed on the second vehicle and to transmit the picture data as a vehicle/vehicle communication to a second transmission module disposed on the first vehicle, and when the first vehicle is operated as a slave vehicle and the second vehicle is operated as the master vehicle, the first vehicle is connected to the second vehicle by the means for coupling and the means for vehicle/vehicle communication, and the at least one camera disposed on the first vehicle is functionally connected to send pictures to the at least one monitor of the second vehicle over the means for vehicle/vehicle communication,
    wherein the drive and guidance system of the first vehicle is connected to receive user input signals from the user elements of the second vehicle so that the first vehicle is remotely controlled from the second vehicle and the first and second vehicles of the not-track-bound vehicle train assembly are operable in a third mode and in a fourth mode, wherein, in the third mode, the first vehicle is driven and steered in front of the second vehicle so as to move therewith, and wherein, in the fourth mode, the first vehicle is driven and steered so as to follow the second vehicle so as to move therewith.

19. A loose coupleable not-track-bound vehicle train assembly comprising:
  (a) a first not-track-bound vehicle comprising:
    i. a first drive and guidance system connected to receive input from a first central processor, a first actuator, and one or more first user elements;
    ii. a first transmission module electronically connected to the first central processor;
    iii. one or more first electronic hitch devices connected to the first central processor; and
    iv. one or more monitors disposed at a first user position and connected to receive picture data from the first transmission module; and
  (b) a second not-track-bound vehicle comprising:
    i. a second drive and guidance system connected to receive input from a second central processor, a second actuator, the one or more first user elements, and one or more second user elements;
    ii. a second transmission module electronically connected to the second central processor;
    iii. one or more second electronic hitch devices connected to the second central processor; and
    iv. one or more cameras disposed on the second vehicle and connected to send picture data to the second central processor;

wherein one first hitch device of the first vehicle is coupled to one second hitch device of the second vehicle;

wherein the first vehicle is the master vehicle and the second vehicle is a slave vehicle;

wherein the one or more first user elements of the master vehicle control the drive and guidance system of the slave vehicle so as to drive and steer the slave vehicle of the not-track-bound vehicle train assembly; and wherein the first vehicle further comprises one or more cameras and the second vehicle further comprises one or more monitors.

* * * * *